United States Patent Office.

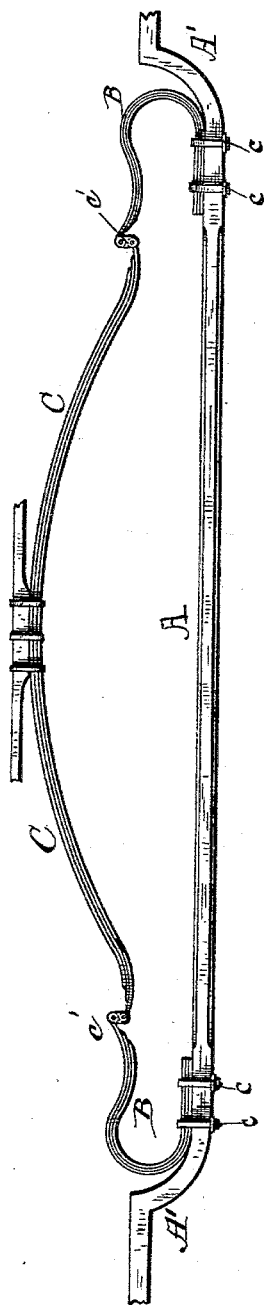

JACOB WOLF, OF CUTCHOGUE, NEW YORK.

VEHICLE-SPRING.

SPECIFICATION forming part of Letters Patent No. 331,669, dated December 1, 1885.

Application filed July 23, 1885. Serial No. 172,457. (No model.)

*To all whom it may concern:*

Be it known that I, JACOB WOLF, a citizen of the United States of America, residing at Cutchogue, in the county of Suffolk and State of New York, have invented certain new and useful Improvements in Vehicle-Springs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in spring-supporting axles for vehicles; and it consists in combining with an axle having upwardly-turned ends a semi-elliptic or half-scroll spring, as will be hereinafter fully set forth, and specifically pointed out in the claims.

In the accompanying drawings I have illustrated my improvement by a side view, in which A represents the axle the ends A' of which are bent upwardly and then again outwardly, so as to be on a line with the main body portion. On the outer ends of these portions A' are formed the axle-arms. The body-spring C is attached pivotally by links $c'$ to the upper ends of the auxiliary springs B, which are secured at their lower parts to the axle by shackles or clips $c$, the spring C being what is commonly known as a "semi-elliptical" spring.

When a load is placed upon the spring C and the same is depressed, it will force the members B outwardly, and if the weight is excessive said members will be forced against the upwardly-bent portions A' of the axle, so as to brace the same and bring the strain upon their inwardly-projecting portions. This construction prevents the main portion of the spring striking the axle. This construction also prevents the spring becoming "set," as they are liable to when subjected to undue strain.

A spring when constructed in accordance with my invention may be very flexible, as it will be re-enforced by the curved portion of the axle when it is depressed.

I claim—

1. The combination, with an axle having upwardly-curved portions A', of auxiliary springs attached to the axle within its curved portions, and constructed to abut against said curved portions and to receive the body-spring, substantially as described.

2. In combination with an axle having upwardly-curved portions, a spring consisting of a body portion, C, and curved end members, B, pivotally connected thereto, said members being clipped to the axle, su btal shown, and for the purpose set forth. nature In testimony whereof I affix my sig in presence of two witnesses.

JACOB WOLF.

Witnesses:
 ISAAC N. WILBER,
 EDUARD E. GRATHWOHL.